(12) United States Patent
Norman (10) Patent No.: US 8,230,875 B2
(45) Date of Patent: Jul. 31, 2012

(54) CHECK VALVE

(75) Inventor: Jamie Norman, Hamilton (CA)

(73) Assignee: Cambridge Brass, Inc., Cambridge, Ontario (CA)

( * ) Notice: Subject to any disclaimer, the term of this patent is extended or adjusted under 35 U.S.C. 154(b) by 829 days.

(21) Appl. No.: 11/314,211

(22) Filed: Dec. 21, 2005

(65) Prior Publication Data

US 2007/0044848 A1    Mar. 1, 2007

(30) Foreign Application Priority Data

Sep. 1, 2005    (CA) .................................... 2517785

(51) Int. Cl.
    *F16K 15/02*    (2006.01)
(52) U.S. Cl. ................... 137/315.33; 137/512; 137/542
(58) Field of Classification Search ............ 137/315.33, 137/512, 540, 542
See application file for complete search history.

(56) References Cited

U.S. PATENT DOCUMENTS

| | | | |
|---|---|---|---|
| 181,168 A | 8/1876 | Hill et al. | |
| 1,767,538 A * | 6/1930 | Mahan | 137/515.3 |
| 1,953,007 A | 7/1930 | Farmer | |
| 2,833,301 A | 1/1956 | Argus | |
| 2,870,779 A * | 1/1959 | Thomiszer | 137/219 |
| 3,913,615 A * | 10/1975 | Cooper | 137/543.19 |
| 4,282,897 A | 8/1981 | de Mey, II | |
| 4,284,097 A | 8/1981 | Becker et al. | |
| 4,532,958 A | 8/1985 | Napolitano | |
| 4,614,113 A | 9/1986 | Daghe et al. | |
| 4,614,201 A * | 9/1986 | King et al. | 137/68.15 |
| 4,893,654 A | 1/1990 | Feuz | |
| 4,911,196 A * | 3/1990 | Kemp | 137/220 |
| 5,031,661 A | 7/1991 | Feuz | |
| 5,113,900 A * | 5/1992 | Gilbert | 137/515.5 |
| 5,148,828 A | 9/1992 | Farnham | |
| 5,326,002 A * | 7/1994 | Dubini | 222/402.1 |
| 5,559,289 A | 9/1996 | Brunson, IV et al. | |
| 5,921,276 A * | 7/1999 | Lam et al. | 137/514.7 |
| 6,220,282 B1 | 4/2001 | Powell | |
| 6,478,047 B1 | 11/2002 | Powell | |
| 6,581,626 B2 | 6/2003 | Noll et al. | |
| 6,866,062 B2 * | 3/2005 | Lammers | 137/543 |
| 7,588,047 B2 * | 9/2009 | Vogt | 137/220 |
| 2003/0201014 A1 * | 10/2003 | Krishnamoorthy et al. | 137/542 |
| 2005/0109404 A1 | 5/2005 | Fazekas | |

* cited by examiner

Primary Examiner — Kevin Lee
Assistant Examiner — Macade Brown
(74) Attorney, Agent, or Firm — Wood, Phillips, Katz, Clark & Mortimer (57) ABSTRACT

A poppet-style check valve for allowing uni-directional flow in a fluid conducting system. The check valve comprises a valve body, and a poppet mounted therein for reciprocal axial movement between a first position in which the poppet is pressed against a valve seat restricting flow through the check valve, and a second position in which the poppet is spaced from the valve seat permitting flow through the check valve. An inner bore of the valve body is expanded in the area of the poppet to maximize flow through the check valve, and the external dimensions of the check valve are minimized by eliminating a conventional liner between the poppet and the valve body. Additionally, the elements of the valve mechanism are designed such that they lock in place within the valve body during assembly.

22 Claims, 8 Drawing Sheets

CHECK VALVE

FIELD OF THE INVENTION

The invention relates to check valves, and in particular to valves used to prevent backflow through a fluid-conducting passage.

BACKGROUND OF THE INVENTION

Particularly in the plumbing and waterworks industries, situations frequently arise where it is important to ensure that a fluid flows through a conduit in only one direction. Such a result is often achieved by introducing a check valve into the conduit. Check valves utilize any of a variety of valve mechanisms, including balls, flaps, swing doors, and poppets to allow fluids to flow in one direction, but not the other.

One exemplary situation in which uni-directional flow is desirable is in residential water supply applications. In such applications, it is preferable to allow water to flow only from the water main into the residence, and not vice versa. This is because should water flow from the residence to the water main (which can occur when there is a pressure drop in the water main caused by, for example, a broken water main or burst fire hydrant), the municipal water supply can be contaminated. Traditionally, residential water supply applications have not included check valves. However, in view of increasing concerns about the safety of municipal water supplies, a demand has arisen among municipalities to retrofit existing residential water supply plumbing to install check valves therein.

Many existing check valves however have been found to be unsuitable for use in such retrofits for various reasons. For example, many existing check valves are simply too long or are otherwise too large to fit in the available space. Others utilize valve mechanisms which do not allow for sufficient flow rates thereby unacceptably reducing residential water pressure. Other valves have too many moving parts or parts which can fall out of the valves during handling, resulting in difficulties during installation. Finally, many check valves are simply not suitable for situations where neither of the connections between which the valve is to be mounted, is rotatable, as may be the case when inserting a check valve between a water meter and a supply line in a retrofitting application.

Poppet-style valves are particularly advantageous for such applications because they tend to be simple, durable, reliable and compact. Typically, poppet-style valves consist of one or more sealed valve units contained within a sleeve. Such valve units have a first and a second end and include a poppet, a disk having a guidepost extending perpendicularly from its center, reciprocally slidable axially within the valve unit. The poppet has a sealing surface which can seat against an annular surface at the first end of the valve unit. The poppet is biased towards the first end such that its sealing surface seats against the annular surface when no flow exists through the valve unit. When the fluid pressure at the second end of the valve unit is greater than that at the first end, this pressure differential tends to hold the poppet tightly against the annular surface thereby increasing the sealing force. When the fluid pressure at the first end exceeds the fluid pressure at the second end by an amount sufficient to overcome the biasing of the poppet towards the annular surface, the poppet moves away from the annular surface allowing for fluid flow through the valve unit from the first end to the second end. The sleeve has connections at either end to allow the valve to be mounted in-line in a conduit.

Despite its advantages, poppet-style valves have only seen limited use in residential water supply retrofit applications. This is because conventional designs result in valves having limited flow rates, valves which are often too large for retrofitting applications, and valves which are difficult to service in the field.

SUMMARY OF THE INVENTION

In a broad aspect, the present invention provides a poppet-style check valve comprising: a valve body having a bore therethrough and having an upstream inlet end, a downstream outlet end, an interior surface, and an exterior surface; inlet connection means for connecting said inlet end of said valve body to a fluid supply; outlet connection means for connecting said outlet end of said valve body to a fluid outlet; a valve seat located within said valve body, said valve seat having a valve seat surface defining a bore therethrough; a poppet having a face parallel to the valve seat surface, and a stem substantially perpendicular to said face, said poppet face being sized and shaped to be capable of covering the bore defined by the valve seat surface; a poppet support for receiving said stem of said poppet for reciprocal movement therein between a first position in which the face of the poppet is held against the valve seat surface and a second position in which the poppet face is spaced from the valve seat surface; sealing means for preventing flow through the check valve when the poppet is in its first position; flow means for permitting flow through the check valve when the poppet is in its second position; poppet control means for moving the poppet between its first position and its second position in response to changes in a differential between fluid pressure at the inlet end and fluid pressure at the outlet end of the valve body; wherein said flow means for permitting flow through the check valve when the poppet is in its second position comprises at least one flow passage through each of the valve seat, the valve seat surface, and the poppet support, at least one flow passage around the poppet face, and an expansion of the valve body bore around the poppet face; wherein the flow passage around the poppet face when the poppet is in its second position, is defined by a periphery of the poppet face and the valve body.

Other aspects of the invention include the above check valve wherein:

the poppet support locks into place within the valve body once it is inserted into the valve body during assembly of the check valve;

the poppet support is inserted through the inlet end of the valve body during assembly of the check valve, and locks into place within the valve body by means of upstream facing teeth along a periphery of the poppet support engaging an annular poppet support locking recess on the interior surface of the valve body;

the poppet support is further locked into place within the valve body by means of a downstream-facing surface of the poppet support abutting an upstream-facing poppet support shoulder on the interior surface of the valve body;

the valve seat locks into place within the valve body once it is inserted into the valve body during assembly of the check valve;

the valve seat is inserted through the inlet end of the valve body during assembly of the check valve, and locks into place within the valve body by means of upstream facing teeth along a periphery of the valve seat engaging an annular valve seat locking recess on the interior surface of the valve body;

the valve seat is further locked into place within the valve body by means of a downstream-facing surface of the valve seat abutting an upstream-facing valve seat shoulder on the interior surface of the valve body;

the valve seat is an annular sleeve, the at least one flow passage through the valve seat is a bore defined by the annular sleeve, and the valve seat surface is a downstream end of the annular sleeve;

the valve seat is located within the valve body upstream of the expansion of the valve body bore;

the poppet support has a poppet guide sleeve for receiving the poppet stem, an annular support rim for connecting the poppet support to the interior surface of the valve body, and connecting means for connecting the poppet guide sleeve to the support rim;

the connecting means is a plurality of spokes extending from the poppet guide sleeve to the support rim, spaces between the spokes comprising the at least one flow passage through the poppet support;

exactly three spokes extend from the poppet guide sleeve to the support rim;

the support rim is located within the valve body downstream of the expansion of the valve body bore, and the poppet guide extends upstream from a plane defined by the support rim;

the poppet is located intermediate the valve seat and the poppet support within the valve body, and the poppet stem extends downstream from the poppet face;

the poppet includes an annular poppet seal associated with the poppet face, and the sealing means for preventing flow through the check valve when the poppet is in its first position includes a seal created between the poppet seal and the valve seat surface when the poppet is in its first position;

the poppet seal is held within an annular poppet seal recess on the periphery of the poppet face, said poppet seal recess being defined by an upstream portion of the poppet face, a poppet sleeve extending downstream from the upstream portion of the poppet face, and an annular seal-retention flange extending radially outwardly from the poppet sleeve;

both the poppet seal and the seal-retention flange extend radially outwardly beyond a periphery of the upstream portion of the poppet face such that when the poppet is in its first position, the upstream portion of the poppet face fits within the valve seat surface, the poppet seal contacts the valve seat surface, and the seal-retention flange supports the poppet seal against the valve seat surface;

an upstream surface of the poppet face has a central protrusion to direct fluid flowing downstream through the check valve toward the periphery of the poppet face;

biasing means are provided for biasing the poppet towards its first position;

the poppet control means for moving the poppet between its first position and its second position in response to changes in a differential between fluid pressure at the inlet end and fluid pressure at the outlet end of the valve body comprises the biasing means, as well as upstream and downstream surfaces of the poppet face being substantially perpendicular to a direction of flow through the check valve which causes a force to be exerted on the poppet when a pressure differential exists between the inlet and outlet ends of the valve body, said poppet moving from its first position to its second position when the force exerted on the upstream surface of the poppet face by a higher fluid pressure at the inlet end of the valve body is sufficient to overcome a force exerted by the biasing means, and the poppet moving from its second position to its first position otherwise;

said biasing means is a spring located between the poppet and the poppet support;

the valve seat has an annular valve seat seal mounted within an annular seal recess on a periphery of the valve seat, said sealing means for preventing flow through the check valve when the poppet is in its first position including a fluid seal created by the valve seat seal between the valve seat and the valve body;

the inlet connection means comprises a threaded female connector sealably and rotatably mounted on the inlet end of the valve body; and/or the outlet connection means comprises external threading on the outlet end of the valve body.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A preferred embodiment of the check valve of the present invention will now be described in the context of an exemplary application of retrofitting a residential water supply system to inhibit backflow from a residence to a water main.

In a typical residential water supply system, water from a municipal water main is conveyed to an interior wall of the residence through an underground pipe. A water meter which tracks water use by the residence for billing purposes is mounted to this pipe at the residential end. A supply pipe then conveys the water from the water meter to the various outlets within the residence.

When retrofitting such a residential water supply system to install a check valve, the valve is normally installed between the water meter and the supply pipe. Most typically, the female threaded connector of the supply pipe is disengaged from the male threaded connector of the water meter, the check valve is placed between the two, and the water meter and supply pipe are each connected to each end of the check valve. The check valve is oriented such that it permits flow from the water meter to the supply pipe, but not from the supply pipe to the water meter.

Figure 1:
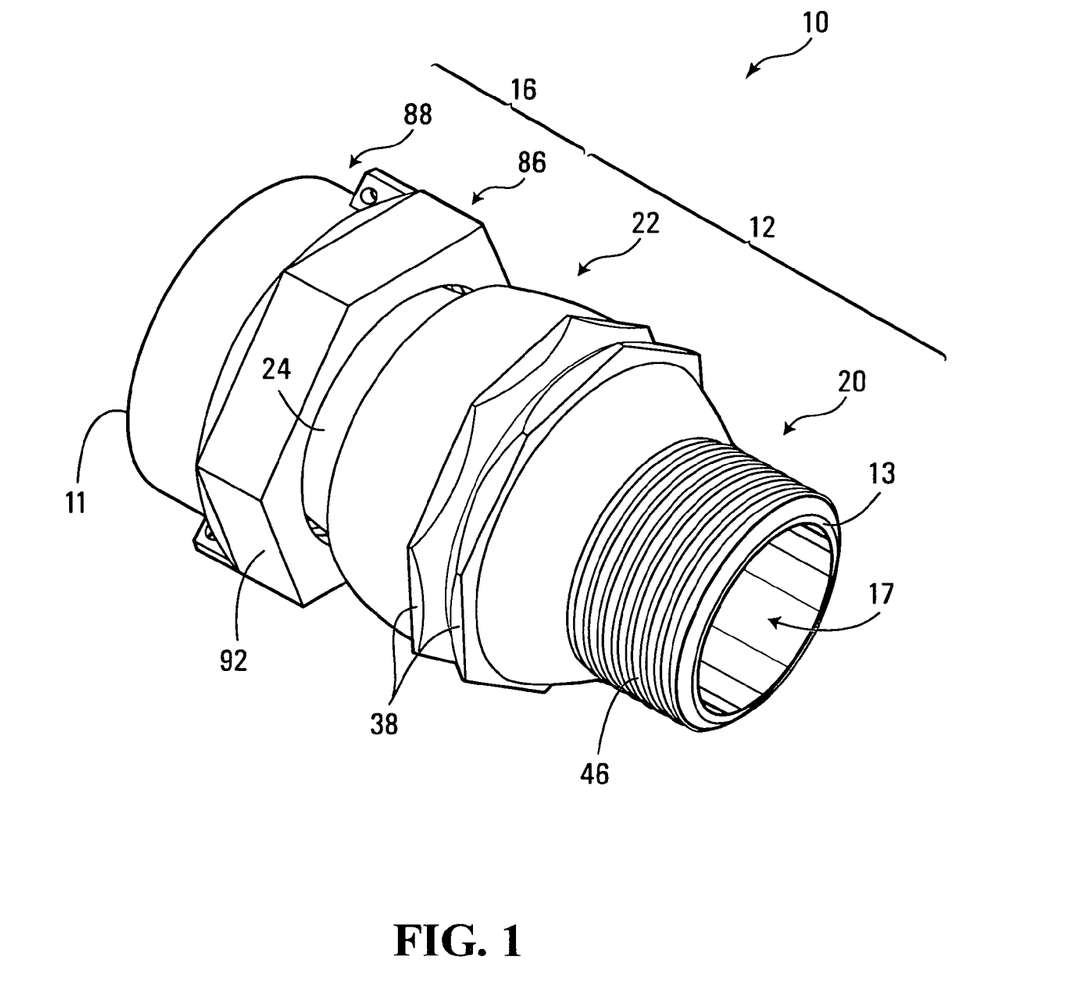
FIG. 1 is a perspective view of the check valve in accordance with a preferred embodiment of the present invention.
Figure 2:
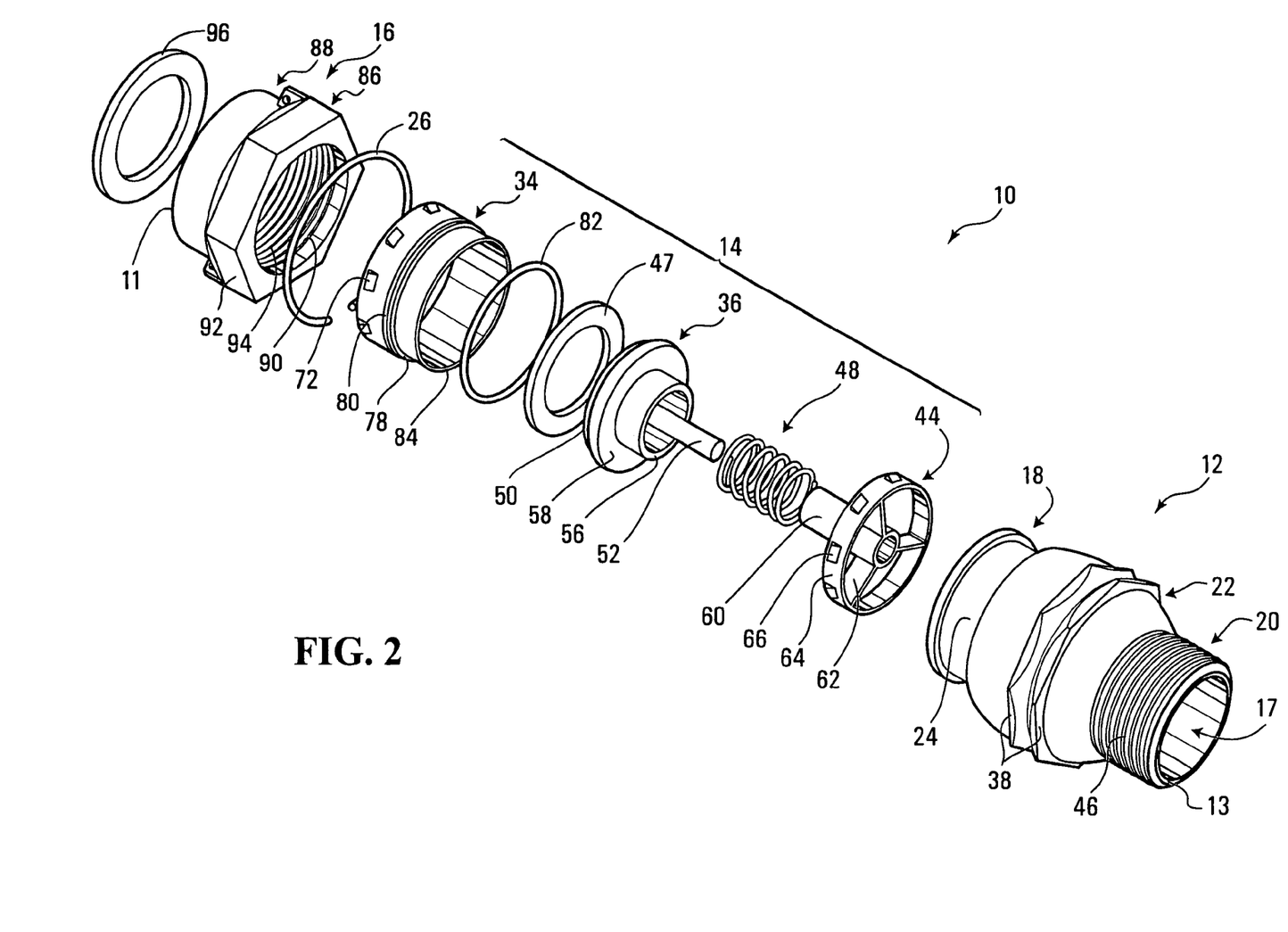
FIG. 2 is a perspective exploded view of the check valve.
Figure 3:
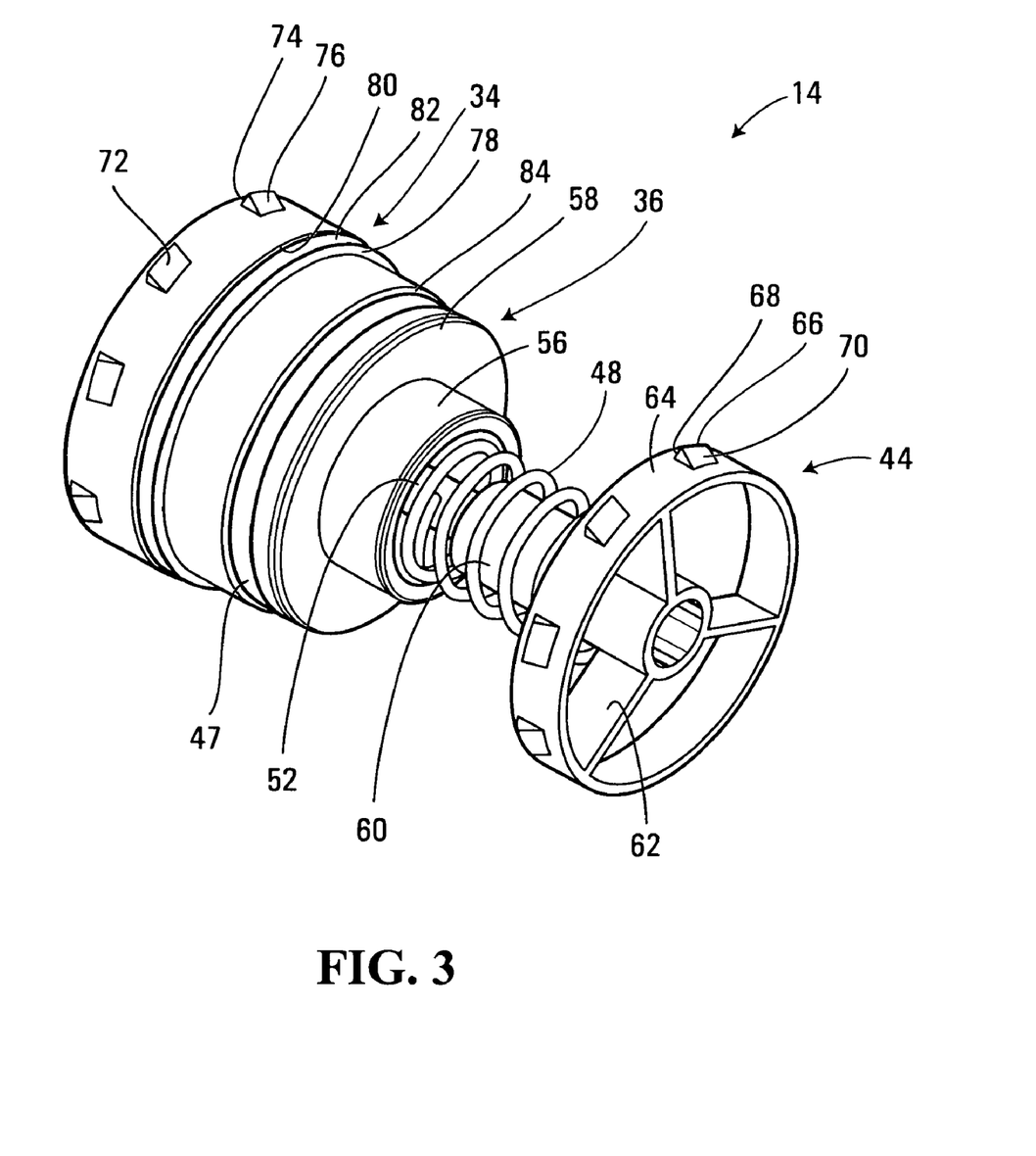
FIG. 3 is a perspective view of a valve cartridge of the check valve.
Figure 4:
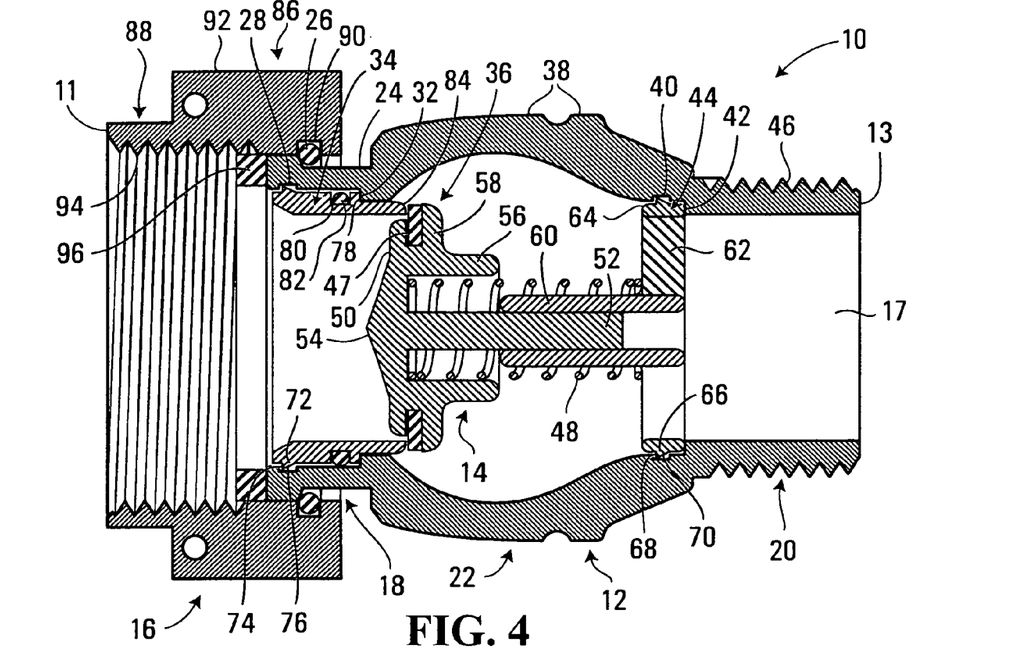
FIG. 4 is a cross-sectional side view of the check valve in a closed position.
Figure 5:
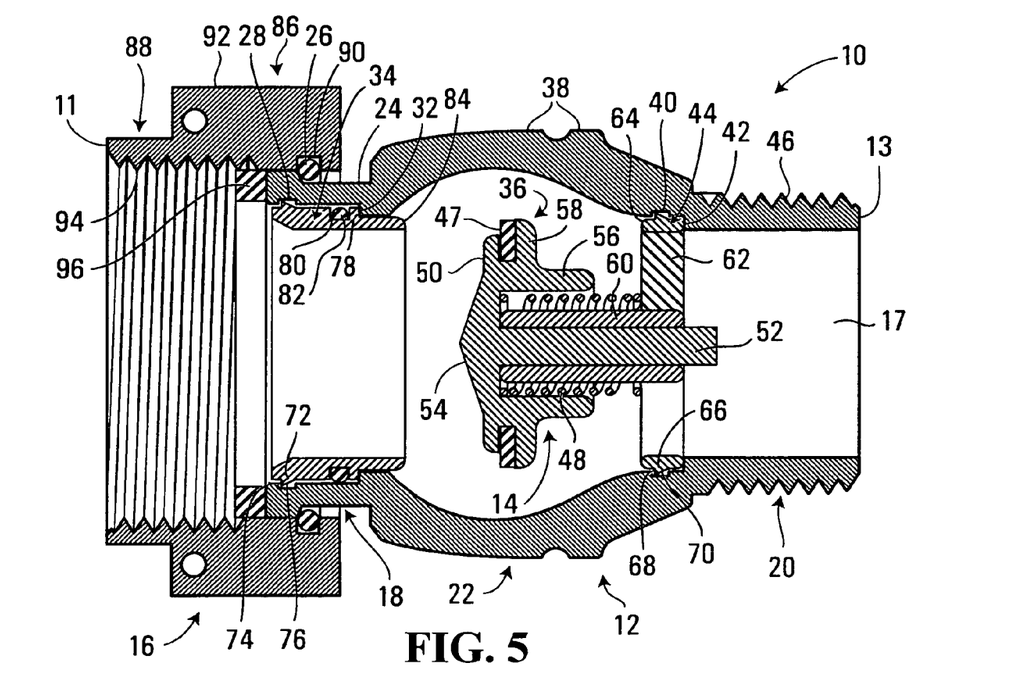
FIG. 5 is a cross-sectional side view of the check valve in an open position.

The preferred embodiment check valve 10 is illustrated in FIGS. 1 through 12. FIGS. 1, 4 and 5 show the check valve 10 in its assembled state while FIG. 2 is an exploded view of the check valve 10, showing its constituent parts. Broadly, the check valve 10 consists of a valve body 12, a valve cartridge 14 (as shown in its assembled form in FIG. 3) located within the valve body 12, and an inlet connection nut 16 attached to an inlet end of the valve body 12. Each of these broad elements will now be discussed in turn.

In this description and in the claims, the terms "axial" and "axially" are used to describe a direction parallel to a centerline of the check valve 10, while "radial" and "radially" are used to describe a direction perpendicular to and extending from the centerline of the check valve 10. Further, "downstream" is used to describe features which are located nearer an outlet end 13 of the check valve 10, while "upstream" is used to describe features which are located nearer an inlet end 11 of the check valve 10.

Figure 6:
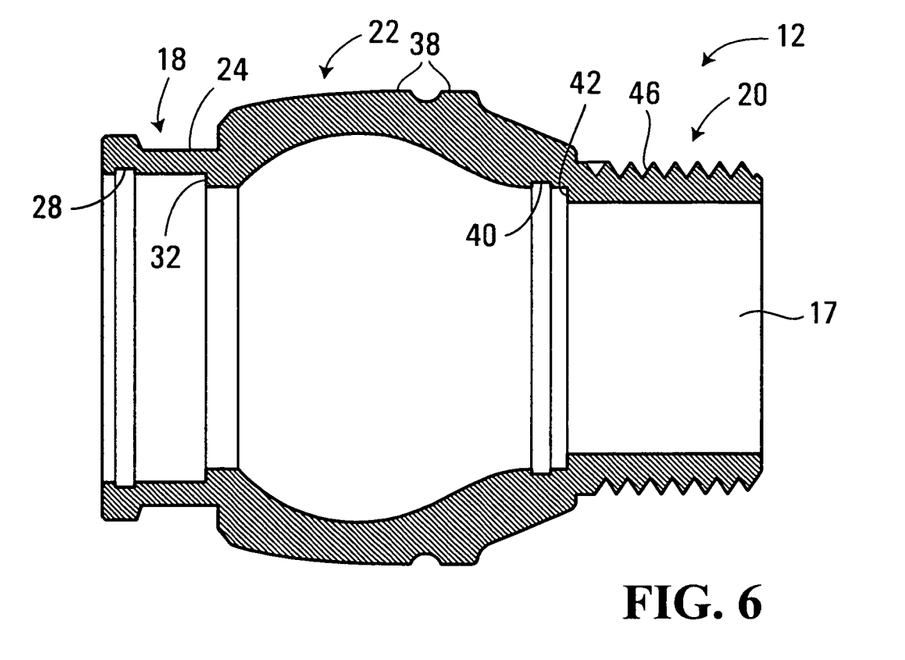
FIG. 6 is a cross-sectional side view of a valve body of the check valve.

The valve body 12, shown in detail in FIG. 6, has an inner bore 17 therethrough, and consists of an upstream inlet section 18, a downstream outlet section 20, and an expanded section 22 intermediate the inlet and outlet sections 18, 20.

An exterior surface of the inlet section 18 is provided with an annular retaining ring recess 24 to accommodate a retaining ring 26, as discussed further below. An interior surface of the inlet section 18 is provided with an annular valve seat locking recess 28 near an upstream end of the valve body 12, and an annular valve seat shoulder 32 near an interface between the inlet section 18 and the expanded section 22. The valve seat locking recess 28 and the valve seat shoulder 32 cooperate to lock a valve seat 34 into its proper position within the valve body 12, as discussed further below.

The inner bore 17 of the expanded section 22 of the valve body 12 has a diameter greater than that for either the inlet section 18 or the outlet section 20. This greater diameter accommodates the flow of fluid through the expanded section 22 around a poppet 36 of the valve cartridge 14 as discussed further below. An exterior surface of the expanded section 22 is provided with two faceted annular protrusions 38 facilitating engagement of the valve body 12 by a tool such as a wrench when threadedly connecting the check valve 10 with the supply pipe. An interior surface of an interface between the expanded section 22 and the outlet section 20 is provided with an annular poppet support locking recess 40 and an annular poppet support shoulder 42 which cooperate to lock a poppet support 44 into its proper position within the valve body 12, as discussed further below.

The outlet section 20 of the valve body 12 is provided on its exterior surface with exterior threading 46 to accommodate connection with the female threaded connector of the supply pipe (not shown).

The valve cartridge 14, shown in FIG. 3, consists of the poppet 36, a poppet seal 47, the poppet support 44, a spring 48 interposed between the poppet 36 and the poppet support 44, and the valve seat 34.

Figure 10:
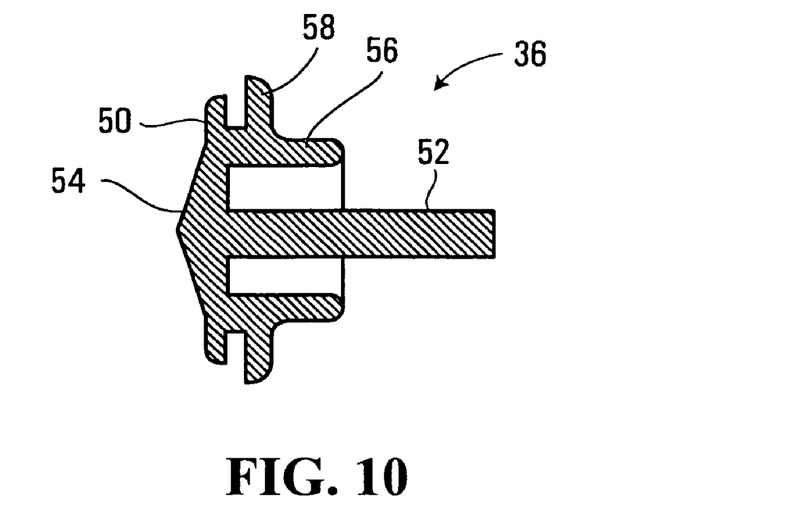
FIG. 10 is a cross-sectional side view of a poppet of the check valve.

The poppet 36, as shown in detail in FIG. 10 has a disc-shaped poppet face 50, with a poppet stem 52 extending downstream from the center thereof. The poppet face 50 has an upstream-facing central protrusion 54 to direct downstream-flowing fluid towards the periphery of the poppet face 50 when the check valve 10 is in its open position. Extending downstream from an upstream portion of the poppet face 50, coaxial with, and surrounding a portion of the poppet stem 52, is an annular spring-retention sleeve 56. The spring-retention sleeve 56 is spaced from the poppet stem 52 so as to accommodate both the poppet support 44 and the spring 48. Extending radially outwardly from the spring-retention sleeve 56 is an annular seal-retention flange 58. The seal-retention flange 58 is spaced downstream from the upstream portion of the poppet face 50 so as to accommodate the annular poppet seal 47 therebetween. The diameter of the upstream portion of the poppet face 50 is less than the diameter of the seal-retention flange 58 so as to allow the poppet seal 47 to be slipped over the upstream portion of the poppet face 50 and into the space between the upstream portion of the poppet face 50 and the seal-retention flange 58 during assembly of the check valve 10. Additionally, this differential in the outer diameters of the upstream portion of the poppet face 50 and the seal-retention flange 58 allows the poppet seal 47 to contact the valve seat 34, and also allows the seal-retention flange 58 to support the poppet seal 47 against the valve seat 34.

Figure 11:
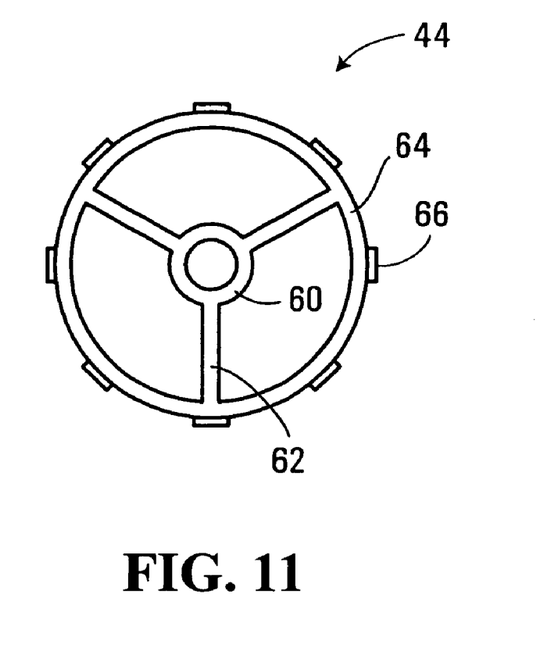
FIG. 11 is an end view of a poppet support of the check valve.
Figure 12:
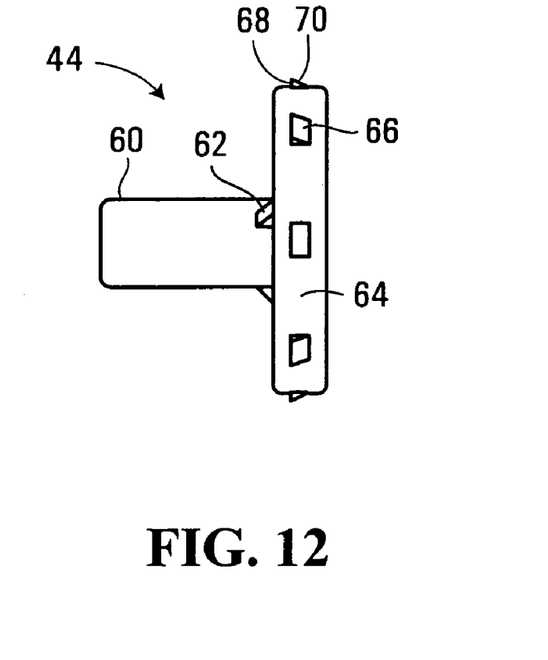
FIG. 12 is a side view of the poppet support.

The poppet support 44, as seen in detail in FIGS. 11 and 12, includes a poppet guide 60, a sleeve whose purpose is to guide reciprocal axial movement of the poppet 36. The inner diameter of the poppet guide 60 is slightly larger than an outer diameter of the poppet stem 52 such that there exists a close fit between the two parts when the poppet stem 52 is inserted into the poppet guide 60. The outer diameter of the poppet guide 60 is sized so as to be spaced radially inwardly from the annular spring-retention sleeve 56 when the check valve 10 is in its open position, so as to accommodate the spring 48 therebetween. A downstream portion of the poppet guide 60 has support spokes 62 extending radially outwardly therefrom, said spokes connecting the poppet guide 60 with a support rim 64. The support spokes 62 are fin-like, having a narrow profile when viewed from a downstream end. Further, the number of support spokes 62 is kept low. Preferably, only three support spokes 62 are provided. The narrow profile of the support spokes 62 as well as the low number of support spokes 62 maximizes the cross-sectional flow area of the poppet support 44. The support rim 64 is annular and is adapted to be locked in position on an interior surface of the valve body 12 at the interface between the expanded section 22 and the outlet section 20. In particular, a downstream portion of the support rim 64 is adapted to abut against the poppet support shoulder 42 of the valve body 12 while a plurality of poppet support locking protrusions or teeth 66 are adapted to be secured within the poppet support locking recess 40 of the valve body 12. The poppet support locking protrusions 66 are spaced circumferentially around an outer surface of the support rim 64 and have a steep upstream face 68 and a sloped downstream face 70 such that the poppet support 44 can be slid into the valve body from its upstream end, and locked into place. The combination of the support rim 64 and the support spokes 62 serves to maintain the poppet guide 60 positioned centrally within the valve body 12, and co-axial therewith.

Figure 8:
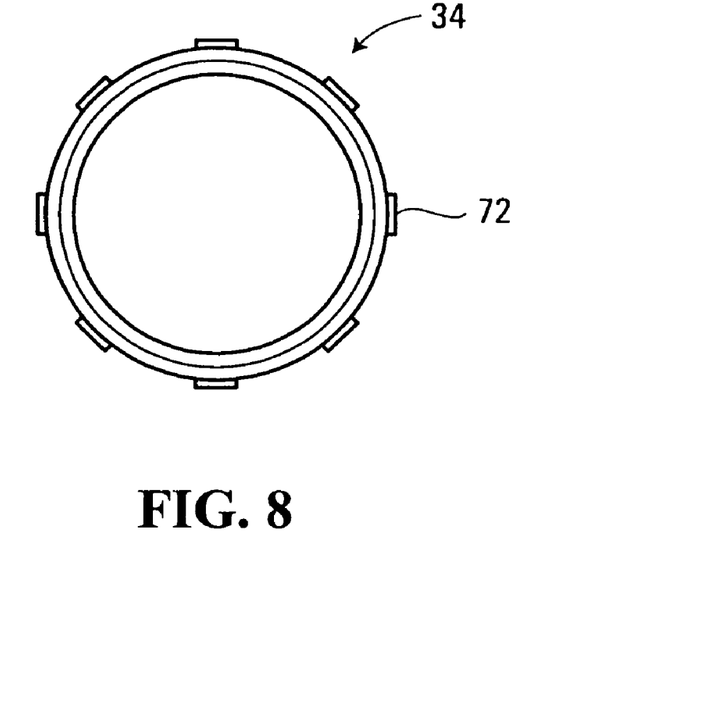
FIG. 8 is an end view of a valve seat of the check valve.
Figure 9:
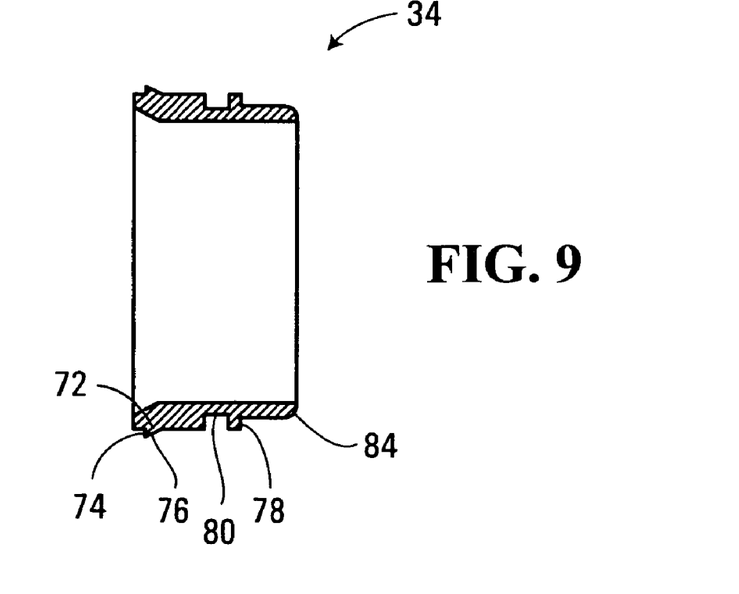
FIG. 9 is a cross-sectional side view of the valve seat.

The valve seat 34, as shown in detail in FIGS. 8 and 9, is an annular sleeve adapted to be locked into place within the inlet section 18 of the valve body 12. Near its upstream end, an outer surface of the valve seat 34 is provided with a plurality of valve seat locking protrusions or teeth 72 adapted to be secured within the valve seat locking recess 28 of the valve body 12. The valve seat locking protrusions 72 are spaced circumferentially around the outer surface of the valve seat 34 and have a steep upstream face 74 and a sloped downstream face 76 such that the valve seat 34 can be slid into the valve body 12 from its upstream end, and locked into place. The outer surface of the valve seat 34 is also provided with an annular shoulder 78 adapted to abut against the valve seat shoulder 32 of the valve body 12 when the valve seat 34 is locked into place within the valve body 12. Still on the outer surface of the valve seat 34, an annular O-ring recess 80 is provided upstream of the shoulder 78. The O-ring recess is adapted to support and retain a valve seat O-ring 82. A downstream end of the valve seat 34 provides an annular valve seat surface 84 against which the poppet seal 47 is pressed when the check valve 10 is in its closed position. The valve seat surface 84 has an inner diameter greater than the outer diameter of the upstream portion of the poppet face 50.

By eliminating a conventional lining wall (not shown) within the valve body 12 in the region surrounding the poppet 36, the flow area around the poppet 36 can be maximized, while the external diameter of the check valve 10 can be minimized.

Figure 7:
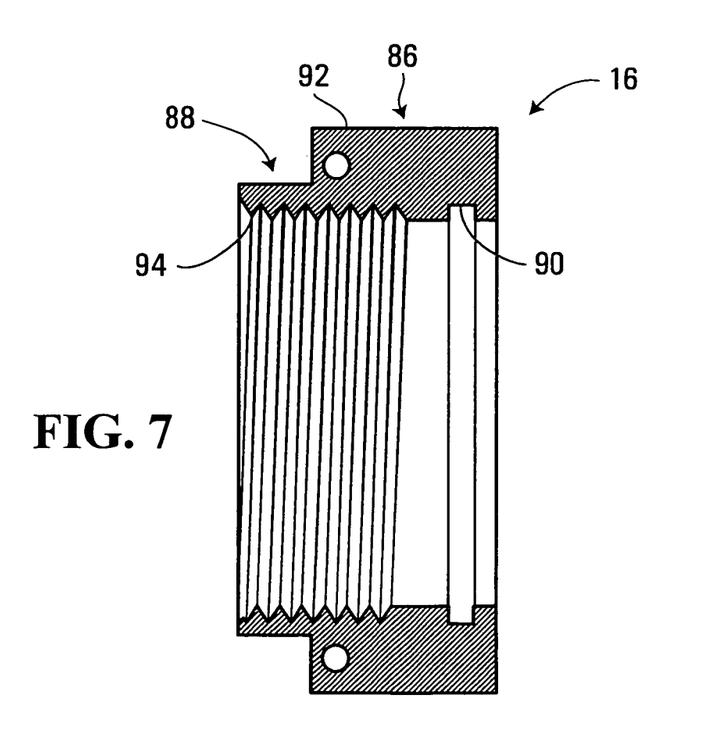
FIG. 7 is a cross-sectional side view of an inlet connection nut of the check valve.

The inlet connection nut 16 has a downstream section 86 and an upstream section 88. An inner surface of the downstream section 86 is sized to fit closely over the outer surface of the inlet portion 18 of the valve body 12, and is provided with an annular retaining ring recess 90 adapted to receive the retaining ring 26. An outer surface of the downstream section 86 is provided with facetted tool-engaging surfaces 92 to allow the inlet connection nut 16 to be engaged by a tool for turning purposes. The upstream section 88 is provided with internal threading 94 to accommodate a threaded connection with the male threaded connector of the water meter (not shown). A gasket 96 is provided within the inlet connection nut 16 near an interface between the downstream section 86 and the upstream section 88. The internal threading 94 and the gasket 96 serve to provide a sealed connection between the check valve 10 and the water meter.

An exemplary manner in which the preferred embodiment check valve 10 may be assembled will now be described.

First, the poppet seal 47 is pushed over the upstream portion of the poppet face 50 and into the annular space between the upstream portion of the poppet face 50 and the seal-retention flange 58. Similarly, the valve seat O-ring 82 is placed into the O-ring recess of the valve seat 34.

Second, the poppet support 44 is slid in through the upstream end of the valve body 12 with its poppet guide 60 facing upstream, until the downstream surface of the support rim 64 abuts against the poppet support shoulder 42 of the valve body 12, and the poppet support locking protrusions 66 engage the poppet support locking recess 40. The resilient flexibility of the support rim 64 and the sloped downstream face 70 of the poppet support locking protrusions 66 cooperate to allow the poppet support locking protrusions 66 to be pushed radially inwardly while the poppet support 44 is being pushed into its locked position, while the steep upstream face 68 of the poppet support locking protrusions 66 serve to lock the poppet support 44 in place within the valve body 12.

Next, the spring 48 is placed over the poppet guide 60 and the poppet 36 is inserted into the valve body 12 with the poppet stem 52 sliding into the poppet guide 60 and the spring-retention sleeve 56 sliding over the spring 48.

The valve seat 34 is then pushed into the valve body 12 with its valve seat surface 84 facing downstream, until the valve seat 34 locks into place with its shoulder 78 abutting the valve seat shoulder 32 of the valve body 12, and the valve seat locking protrusions 72 engaging the valve seat locking recess 28. The resilient flexibility of the valve seat 34 and the sloped downstream face 76 of the valve seat locking protrusions 72 cooperate to allow the valve seat locking protrusions 72 to be pushed radially inwardly while the valve seat 34 is being pushed into its locked position, while the steep upstream face 74 of the valve seat locking protrusions 72 serve to lock the valve seat 34 in place within the valve body 12.

Finally, the retaining ring 26 is placed into the retaining ring recess 24 of the valve body 12, the inlet connection nut 16 is pushed onto the upstream end of the valve body 12 until the retaining ring 26 engages the retaining ring recess 90 of the inlet connection nut 16, and the gasket 96 is inserted into the inlet connection nut 16 until it abuts the upstream end of the valve body 12. The split-ring structure of the retaining ring 26 allows it to be expanded radially to fit over the upstream end of the valve body 12 while fitting the retaining ring 26 into the retaining ring recess 24 of the valve body 12, and to also be compressed radially to allow the downstream end of the inlet connection nut 16 to be slid thereover. Once the retaining ring 26 is engaged within the retaining ring recesses 24, 90 of both the valve body 12 and the inlet connection nut 16, it resists axial movement of the inlet connection nut 16 away from the valve body 12 while allowing the inlet connection nut 16 to rotate relative to the valve body 12 to facilitate connection of the check valve 10 to the water meter.

Although an exemplary manner of assembling the check valve 10 has been described, it is to be understood that the check valve 10 may be assembled using other methods and in other sequences, as will be understood by those skilled in the art.

In use, the supply pipe of the residential water supply system is first disconnected from the water meter. The downstream end of the check valve 10 is then connected to the supply pipe by engaging the external threading 46 of the valve body 12 with internal threading of the female supply pipe connector. To facilitate tightening of the connection, a torquing tool such as a wrench may be used to engage the annular protrusions 38 of the valve body 12.

Next, the inlet connection nut 16 is connected to the water meter by engaging the internal threading 94 of the inlet connection nut 16 with external threading of the male water supply connector. The retainer ring 26 connection between the inlet connection nut 16 and the valve body 12 allows the inlet connection nut 16 to be turned relatively to the valve body 12 to facilitate the threaded connection between the inlet connection nut 16 and the water meter. Again, to facilitate tightening of the connection, a torquing tool may be used to engage the faceted tool-engaging surfaces 92 of the inlet connection nut 16. The gasket 96 ensures a sealed connection between the valve body 12 and the water meter.

When the pressure at the downstream and upstream ends of the check valve 10 are equalized, or when the pressure differential is small, the spring 48 pushes the poppet 36 upstream such that the poppet seal 47 is pressed against the valve seat surface 84 of the valve seat 34, as shown in FIG. 4. In this state, the check valve is closed, and flow through the check valve is restricted.

If the water pressure at the downstream end of the check valve 10 exceeds the pressure at the upstream end, this pressure differential tends to increase the force with which the poppet 36 is pressed against the valve seat 34, thereby improving the seal between the poppet seal 47 and the valve seat surface 84.

If the water pressure at the upstream end of the check valve 10 exceeds the pressure at the downstream end by a degree sufficient to overcome the spring force exerted by the spring 48, then the increased pressure of the water against the poppet face 50 moves the poppet 36 downstream away from the valve seat 34 allowing water to flow from the upstream end of the check valve 10 to the downstream end, as shown in FIG. 5. In this open state, the large central bore of the valve body 12, valve seat 34, the large cross-section openings of the poppet support 44 and the expanded internal diameter of the expanded section 22 of the valve body 12 all serve to maximize the rate at which water can flow through the check valve 10 and to thereby minimize the water pressure drop through the check valve.

Figure 13:
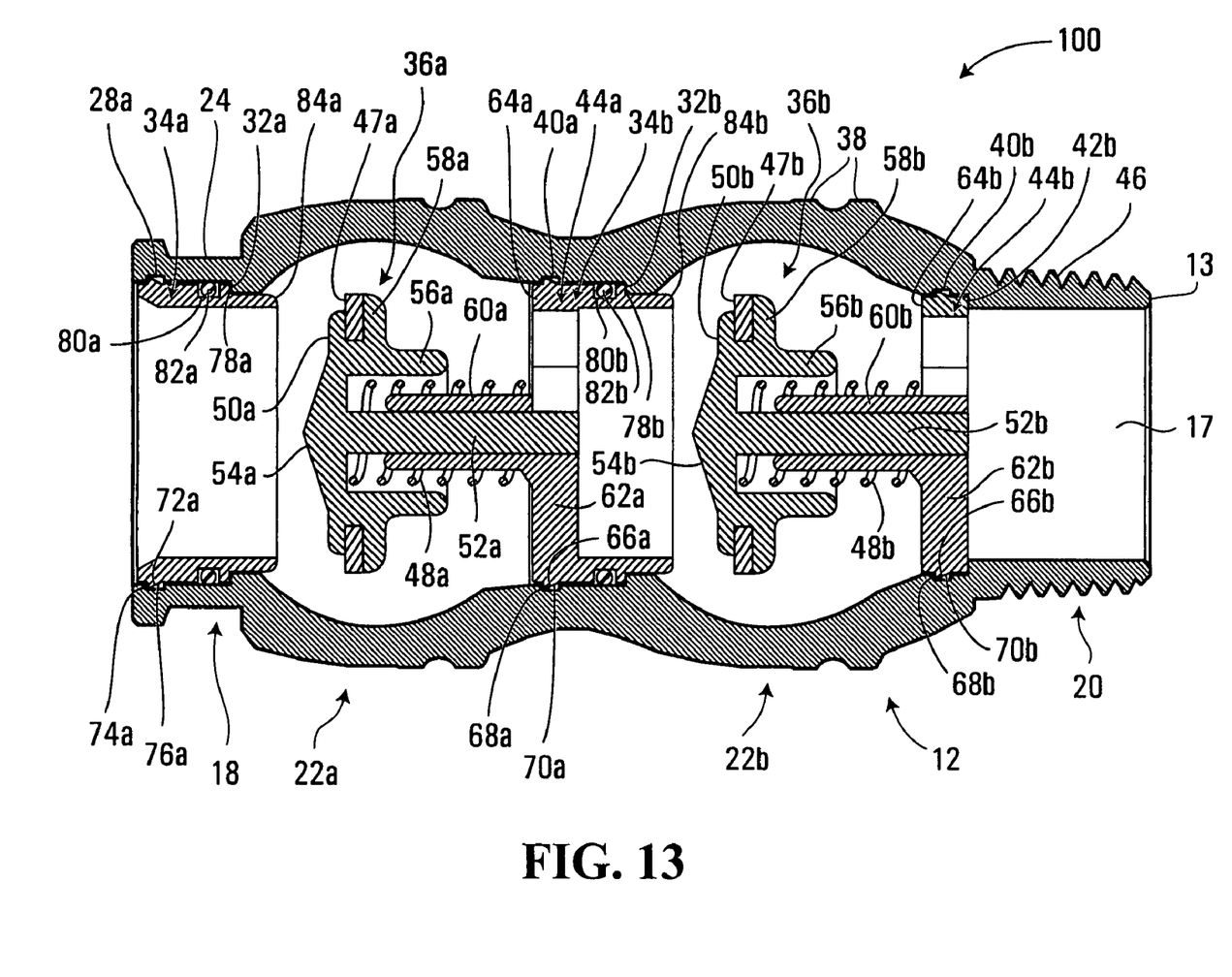
FIG. 13 is a cross-sectional side view of a further embodiment of the present invention without the inlet connection nut.

In applications where the prevention of backflow through the valve is particularly important, redundant valve systems are frequently used. FIG. 13 illustrates a second embodiment 100 of the present invention (without the inlet connection nut 16) in which the valve cartridge contains two valve seat 34/poppet 36/poppet support 44 combinations. In this figure, like elements are identified using the same reference numbers as used in describing the first embodiment, and the two instances of each element are differentiated using the suffixes "a" and "b".

As is apparent from FIG. 13, the second embodiment check valve 100 is substantially the same as the first embodiment check valve 10, with a duplication of some features and the merging of other features. There are now two expanded sections 22a, 22b of the valve body 12 to accommodate the two valve systems. The first expanded section 22a houses the first valve seat 34a, the first poppet 36a and the first poppet support 44a, while the second expanded section 22b houses the second valve seat 34b, second poppet 36b and the second poppet support 44b. The second valve seat 34b is combined with the first poppet support 44a into a single element. Thus, the support rim 64b of the first poppet support 44a is merged into the features of the second valve seat 34b.

The second embodiment check valve 100 therefore provides redundant protection, such that if one of the valve systems fails, the second will function to prevent backflow through the check valve 100.

In both the preferred and second embodiment check valves 10, 100, the valve body 12 and inlet connection nut 16 are made of either brass or bronze, the valve seat 34, poppet 36 and poppet support 44 of the valve cartridge 14 are made of plastic, and the seals and gaskets 47, 82, 96 are made of rubber. However, it is to be understood that other suitable materials may be used as will be appreciated by persons skilled in the art.

In the exemplary application described, the check valve is installed between a water meter and a residential supply pipe to prevent backflow of water from a residence to a water main. However, it is to be understood that the check valve of the present invention may be used in various other applications. For example, the check valve can be used in many plumbing or waterworks application to ensure uni-directional flow through a conduit. It can also be used to ensure uni-directional flow of other fluids, sewage or gasses for example.

Very specific geometries of the various elements have also been provided. However, it is to be understood that other suitable geometries may be used by persons skilled in the art without necessarily departing from the scope of the invention.

Numerous modifications and variations of the present invention are possible in light of the above teachings. It is therefore to be understood that within the scope of the appended claims, the invention may be practised otherwise than as specifically described herein.

The invention claimed is:

1. A poppet-style check valve comprising:
a valve body having a bore therethrough and having an upstream inlet end, a downstream outlet end, an interior surface, and an exterior surface;
inlet connection means for connecting said inlet end of said valve body to a fluid supply;
outlet connection means for connecting said outlet end of said valve body to a fluid outlet;
a valve seat located within said valve body, said valve seat having a valve seat surface defining a bore therethrough;
a poppet having a face parallel to the valve seat surface, and a stem substantially perpendicular to said face, said poppet face being sized and shaped to be capable of covering the bore defined by the valve seat surface;
a poppet support for receiving said stem of said poppet for reciprocal movement therein between a first position in which the face of the poppet is held against the valve seat surface and a second position in which the poppet face is spaced from the valve seat surface;
sealing means for preventing flow through the check valve when the poppet is in its first position;
flow means for permitting flow through the check valve when the poppet is in its second position;
poppet control means for moving the poppet between its first position and its second position in response to changes in a differential between fluid pressure at the inlet end and fluid pressure at the outlet end of the valve body;
wherein said flow means for permitting flow through the check valve when the poppet is in its second position comprises at least one flow passage through each of the valve seat, the valve seat surface, and the poppet support, at least one flow passage around the poppet face, and a continuous expansion of the valve body bore around the poppet face, said continuous expansion extending from the first position to the second position;
wherein the flow passage around the poppet face when the poppet is in its second position is defined by a periphery of the poppet face and the valve body bore; and
wherein the valve body bore is sized to allow the valve seat and the poppet support to be inserted through the inlet end of the valve body to assemble the check valve.

2. The check valve of claim 1 wherein the valve seat is an annular sleeve, the at least one flow passage through the valve seat is a bore defined by the annular sleeve, and the valve seat surface is a downstream end of the annular sleeve.

3. The check valve of claim 1 wherein the valve seat is located within the valve body upstream of the expansion of the valve body bore.

4. The check valve of claim 1 wherein the poppet support has a poppet guide sleeve for receiving the poppet stem, an annular support rim for connecting the poppet support to the interior surface of the valve body, and connecting means for connecting the poppet guide sleeve to the support rim.

5. The check valve of claim 1 wherein the poppet is located intermediate the valve seat and the poppet support within the valve body, and the poppet stem extends downstream from the poppet face.

6. The check valve of claim 5 wherein the poppet includes an annular poppet seal associated with the poppet face, and the sealing means for preventing flow through the check valve when the poppet is in its first position includes a seal created between the poppet seal and the valve seat surface when the poppet is in its first position.

7. The check valve of claim 6 wherein the poppet seal is held within an annular poppet seal recess on the periphery of the poppet face, said poppet seal recess being defined by an upstream portion of the poppet face, a poppet sleeve extending downstream from the upstream portion of the poppet face, and an annular seal-retention flange extending radially outwardly from the poppet sleeve.

8. The check valve of claim 7 wherein both the poppet seal and the seal-retention flange extend radially outwardly beyond a periphery of the upstream portion of the poppet face such that when the poppet is in its first position, the upstream portion of the poppet face fits within the valve seat surface, the poppet seal contacts the valve seat surface, and the seal-retention flange supports the poppet seal against the valve seat surface.

9. The check valve of claim 7 wherein an upstream surface of the poppet face has a central protrusion to direct fluid flowing downstream through the check valve toward the periphery of the poppet face.

10. The check valve of claim 7 further comprising biasing means for biasing the poppet towards its first position.

11. The check valve of claim 10 wherein the poppet control means for moving the poppet between its first position and its second position in response to changes in a differential between fluid pressure at the inlet end and fluid pressure at the outlet end of the valve body comprises the biasing means, as well as upstream and downstream surfaces of the poppet face being substantially perpendicular to a direction of flow through the check valve which causes a force to be exerted on the poppet when a pressure differential exists between the inlet and outlet ends of the valve body, said poppet moving from its first position to its second position when the force exerted on the upstream surface of the poppet face by a higher fluid pressure at the inlet end of the valve body is sufficient to overcome a force exerted by the biasing means, and the poppet moving from its second position to its first position otherwise.

12. The check valve of either one of claims 10 and claim 11 wherein said biasing means is a spring located between the poppet and the poppet support.

13. The check valve of claim 7 wherein the valve seat has an annular valve seat seal mounted within an annular seal recess on a periphery of the valve seat, said sealing means for preventing flow through the check valve when the poppet is in its first position including a fluid seal created by the valve seat seal between the valve seat and the valve body.

14. The check valve of claim 7 wherein the inlet connection means comprises a threaded female connector sealably and rotatably mounted on the inlet end of the valve body.

15. The check valve of claim 7 wherein the outlet connection means comprises external threading on the outlet end of the valve body.

16. A poppet-style check valve comprising:
a valve body having a bore therethrough and having an upstream inlet end, a downstream outlet end, an interior surface, and an exterior surface;
inlet connection means for connecting said inlet end of said valve body to a fluid supply;
outlet connection means for connecting said outlet end of said valve body to a fluid outlet;
a valve seat located within said valve body, said valve seat having a valve seat surface defining a bore therethrough;
a poppet having a face parallel to the valve seat surface, and a stem substantially perpendicular to said face, said poppet face being sized and shaped to be capable of covering the bore defined by the valve seat surface;
a poppet support for receiving said stem of said poppet for reciprocal movement therein between a first position in which the face of the poppet is held against the valve seat surface and a second position in which the poppet face is spaced from the valve seat surface;
sealing means for preventing flow through the check valve when the poppet is in its first position;
flow means for permitting flow through the check valve when the poppet is in its second position;
poppet control means for moving the poppet between its first position and its second position in response to changes in a differential between fluid pressure at the inlet end and fluid pressure at the outlet end of the valve body;
wherein said flow means for permitting flow through the check valve when the poppet is in its second position comprises at least one flow passage through each of the valve seat, the valve seat surface, and the poppet support, at least one flow passage around the poppet face, and a continuous expansion of the valve body bore around the poppet face, said continuous expansion extending from the first position to the second position;
wherein the flow passage around the poppet face when the poppet is in its second position is defined by a periphery of the poppet face and the valve body bore;
wherein the valve body bore is sized to allow the valve seat and the poppet support to be inserted through the inlet end of the valve body to assemble the check valve; and
wherein the poppet support is locked into place within the valve body by means of upstream facing teeth along a periphery of the poppet support engaging an annular poppet support locking recess on the interior surface of the valve body and by a downstream-facing surface of the poppet support abutting an upstream-facing poppet support shoulder on the interior surface of the valve body.

17. A poppet-style check valve comprising:
a valve body having a bore therethrough and having an upstream inlet end, a downstream outlet end, an interior surface, and an exterior surface;
inlet connection means for connecting said inlet end of said valve body to a fluid supply;
outlet connection means for connecting said outlet end of said valve body to a fluid outlet;
a valve seat located within said valve body, said valve seat having a valve seat surface defining a bore therethrough;
a poppet having a face parallel to the valve seat surface, and a stem substantially perpendicular to said face, said poppet face being sized and shaped to be capable of covering the bore defined by the valve seat surface;
a poppet support for receiving said stem of said poppet for reciprocal movement therein between a first position in which the face of the poppet is held against the valve seat surface and a second position in which the poppet face is spaced from the valve seat surface;
sealing means for preventing flow through the check valve when the poppet is in its first position;
flow means for permitting flow through the check valve when the poppet is in its second position;
poppet control means for moving the poppet between its first position and its second position in response to changes in a differential between fluid pressure at the inlet end and fluid pressure at the outlet end of the valve body;
wherein said flow means for permitting flow through the check valve when the poppet is in its second position comprises at least one flow passage through each of the valve seat, the valve seat surface, and the poppet support, at least one flow passage around the poppet face, and a continuous expansion of the valve body bore around the poppet face, said continuous expansion extending from the first position to the second position;
wherein the flow passage around the poppet face when the poppet is in its second position is defined by a periphery of the poppet face and the valve body bore;
wherein the valve body bore is sized to allow the valve seat and the poppet support to be inserted through the inlet end of the valve body to assemble the check valve; and
wherein the valve seat locks into place within the valve body by means of upstream facing teeth along a periphery of the valve seat engaging an annular valve seat locking recess on the interior surface of the valve body.

18. The check valve of claim 17 wherein the valve seat is further locked into place within the valve body by means of a downstream-facing surface of the valve seat abutting an upstream-facing valve seat shoulder on the interior surface of the valve body.

19. A poppet-style check valve comprising:
a valve body having a bore therethrough and having an upstream inlet end, a downstream outlet end, an interior surface, and an exterior surface;
inlet connection means for connecting said inlet end of said valve body to a fluid supply;
outlet connection means for connecting said outlet end of said valve body to a fluid outlet;
a valve seat located within said valve body, said valve seat having a valve seat surface defining a bore therethrough;
a poppet having a face parallel to the valve seat surface, and a stem substantially perpendicular to said face, said poppet face being sized and shaped to be capable of covering the bore defined by the valve seat surface
a poppet support for receiving said stem of said poppet for reciprocal movement therein between a first position in which the face of the poppet is held against the valve seat surface and a second position in which the poppet face is spaced from the valve seat surface;
sealing means for preventing flow through the check valve when the poppet is in its first position;
flow means for permitting flow through the check valve when the poppet is in its second position;
poppet control means for moving the poppet between its first position and its second position in response to changes in a differential between fluid pressure at the inlet end and fluid pressure at the outlet end of the valve body;
wherein said flow means for permitting flow through the check valve when the poppet is in its second position comprises at least one flow passage through each of the valve seat, the valve seat surface, and the poppet support, at least one flow passage around the poppet face, and a continuous expansion of the valve body bore around the poppet face, said continuous expansion extending from the first position to the second position;
wherein the flow passage around the poppet face when the poppet is in its second position is defined by a periphery of the poppet face and the valve body bore;
wherein the valve body bore is sized to allow the valve seat and the poppet support to be inserted through the inlet end of the valve body to assemble the check valve;
wherein the poppet support has a poppet guide sleeve for receiving the poppet stem, an annular support rim for connecting the poppet support to the interior surface of the valve body, and connecting means for connecting the poppet guide sleeve to the support rim; and
wherein the connecting means is a plurality of spokes extending radially from the poppet guide sleeve to the support rim, spaces between the spokes comprising the at least one flow passage through the poppet support.

20. The check valve of claim 19 wherein exactly three spokes extend from the poppet guide sleeve to the support rim.

21. The check valve of any one of claims 4 to 20 wherein the support rim is located within the valve body downstream of the expansion of the valve body bore, and the poppet guide extends upstream from a plane defined by the support rim.

22. A poppet-style check valve comprising:
a valve body having a bore therethrough and having an upstream inlet end, a downstream outlet end, an interior surface, and an exterior surface;
inlet connection means for connecting said inlet end of said valve body to a fluid supply;
outlet connection means for connecting said outlet end of said valve body to a fluid outlet;
a valve seat located within said valve body, said valve seat having a valve seat surface defining a bore therethrough;
a poppet having a face parallel to the valve seat surface, and a stem substantially perpendicular to said face, said poppet face being sized and shaped to be capable of covering the bore defined by the valve seat surface;
a poppet support for receiving said stem of said poppet for reciprocal movement therein between a first position in which the face of the poppet is held against the valve seat surface and a second position in which the poppet face is spaced from the valve seat surface;
sealing means for preventing flow through the check valve when the poppet is in its first position;
flow means for permitting flow through the check valve when the poppet is in its second position;
poppet control means for moving the poppet between its first position and its second position in response to changes in a differential between fluid pressure at the inlet end and fluid pressure at the outlet end of the valve body;
wherein said flow means for permitting flow through the check valve when the poppet is in its second position comprises at least one flow passage through each of the valve seat, the valve seat surface, and the poppet support, at least one flow passage around the poppet face, and a continuous expansion of the valve body bore around the poppet face, said continuous expansion extending from the first position to the second position;
wherein the flow passage around the poppet face when the poppet is in its second position is defined by a periphery of the poppet face and the valve body bore; and
wherein the valve body bore has a minimum diameter $D_1$ at the inlet end and the valve seat and poppet support each have a maximum diameter that is less than $D_1$ to allow the valve seat and poppet support to be inserted through the inlet end of the valve body to assemble the check valve.

* * * * *